United States Patent [19]

Armijo et al.

[11] 4,383,014
[45] May 10, 1983

[54] ADDITIVE FOR IRON DISULFIDE CATHODES USED IN THERMAL BATTERIES

[75] Inventors: James R. Armijo; Jimmie Q. Searcy, both of Albuquerque, N. Mex.

[73] Assignee: The United States of America as represented by the United States Department of Energy, Washington, D.C.

[21] Appl. No.: 361,151

[22] Filed: Mar. 23, 1982

[51] Int. Cl.$^3$ .............................................. H01M 4/52
[52] U.S. Cl. .................................. 429/112; 429/221; 252/182.1
[58] Field of Search .............................. 429/112, 221; 252/182.1

[56] References Cited

U.S. PATENT DOCUMENTS 4,018,970  4/1977  Jumel et al. ......................... 429/162
4,163,829  8/1979  Kronenberg ........................ 429/194

OTHER PUBLICATIONS

Domelen et al., A Review of Thermal Battery Tech., American Society of Mech. Engineers, 9th Intersociety Energy Conversion Eng. Conf.
Levy et al., Studies of the Abnormally High Peak Voltage Observed with FeS$_2$ Depolarized Thermal Batteries, Sandia Laboratories, 1979, SAND 79-0090.
Quinn et al., Development of a Lithium Alloy/Iron Disulfide 60-Minute Primary Thermal Battery, Sandia Laboratories, 1979, SAND 79-0814.

Primary Examiner—Donald L. Walton

[57] ABSTRACT

The invention comprises thermal batteries employing an FeS$_2$ depolarizer, i.e. cathode material, and the depolarizer itself. A minor amount of CaSi$_2$ preferably, 1–3% by weight is provided as an additive in the FeS$_2$ depolarizer to eliminate the voltage transient (spike) which normally occurs upon activation of batteries of this type. The amount of FeS$_2$ by weight generally comprises 64–90%.

12 Claims, 2 Drawing Figures

ADDITIVE FOR IRON DISULFIDE CATHODES USED IN THERMAL BATTERIES

The U.S. Government has rights in this invention pursuant to Contract No. DE-AC04-76DP00789 between the U.S. Department of Energy and Western Electric Company.

BACKGROUND OF THE INVENTION

This invention relates to thermal batteries employing a depolarized cathode comprising a major amount of cathode active material such as iron disulfide ($FeS_2$).

A thermal battery is a battery which has an electrolyte comprising a salt mixture. Ordinarily, the salt mixture electrolyte is solid and chemically inert at room temperature, but when fused becomes fluid and highly conductive.

The development of thermal battery technology is discussed in detail in a report published by The American Society of Mechanical Engineers entitled *A Review of Thermal Battery Technology* by B. H. Van Domelen and R. D. Wehrle, reprinted from the 9th Intersociety Energy Conversion Engineering Conference, and is incorporated by reference herein.

Present day $Ca/CaCrO_4$ thermal batteries have what is known as a "pellet" type construction, which is typically of a three-layer design comprising a heat pellet, an anode, and a DEB pellet sandwiched between the latter two described pellets.

The first "pellet" type thermal batteries included a heat pellet composed generally of powdered iron fuel and potassium perchlorate oxidizer pressed into a homogeneous pellet. The anode generally comprised either sheet calcium mechanically attached to a non-reactive metal substrate, or calcium metal vapor deposited upon a metal substrate. The substrate served both as a current collector and as a cell divider that prevented the calcium from reacting with an adjacent heat pellet of a three pellet single cell, and the cells were combined with end heat pellets and buffer pellets arranged to form a battery stack.

In the early pellet type thermal batteries the cathode (or DEB) pellet was generally composed of a mixture of depolarizer (conventionally known as the active cathode material which is reduced electrochemically during battery discharge), electrolyte, and binder. The depolarizer or cathode material commonly used was $CaCrO_4$, the electrolyte was a LiCl-KCl eutectic, and the binder was a finely divided silica powder whose high surface area prevented the molten electrolyte from flowing. The materials were fused, ground and blended to obtain a homogeneous powder which permitted the pellet to be formed in one pressing.

Although $CaCrO_4$ cells operate satisfactorily for most applications, recent work has shown that thermal cells using $FeS_2$ as the depolarizer or cathode material provide more easily reproducible batteries and greater current capabilities, particularly on long-life tests, than do the $CaCrO_4$ cells. The $FeS_2$ type thermal cell requires a separator pellet (or a separator layer in a two-layer pellet) between the cathode and the anode, and is discussed in greater detail in *Development of a Lithium Alloy Iron Disulfide 60-Minute Primary Thermal Battery*, SAND 79-0814, Sandia Laboratories, April 1979, which is also incorporated by reference herein.

Although exhibiting longer life and greater voltage stability, these type cells pose a problem in that when activated, there is observed an abnormally high initial peak voltage, i.e., spike, which drops rapidly to the normal voltage output plateau when the cell is discharged at low-current densities. This poses a serious problem since in most applications voltage regulation is critical, and end of life of the battery is calculated as a percent value of the peak voltage (usually 75 or 80%). Thus, much useful life is wasted unless the spike is minimized. As a result, there have been various attempts to minimize and isolate the cause of the voltage spike, all of which have proven generally unsatisfactory. (For a detailed report see the report published by Sandia Laboratories, April 1979 entitled *Studies of the Abnormally High Peak Voltage Observed with $FeS_2$ Depolarized Thermal Batteries*, also incorporated by reference herein).

One approach to eliminating or reducing the voltage spike discussed in said document involves treating the $FeS_2$ with $H_2S$ prior to manufacturing the cathode pellets. In the manufacturing of the pellets it is believed that the $FeS_2$ reacts with atmospheric oxygen to form impurities which contribute to the cause of the spike. By treating the $FeS_2$ with $H_2S$, the $H_2S$ reacts with the surface oxidant on the $FeS_2$ so that gaseous products are formed and carried away to reduce the surface to $FeS_2$ alone.

Another approach involved adding small amounts of magnesium to the cathode pellet. Although the voltage spike was reduced, this approach did not completely remove the voltage spike, i.e., a spike of $1.241 \pm 0.004$ volts was still observed for a 28 volt battery. Other metals were also tried and deposited in a thin film on the cathode collector. The metals tested, which are above silver in the Electromotive Series, were also found to reduce the magnitude of the initial peak voltage. However, the lowest peak voltage observed in this technique was achieved with Zinc and still resulted in a peak voltage of 1.122 V. Thus, the lifetime of the battery to 80% peak voltage was still very short.

In a remotely related development, U.S. Pat. No. 4,163,829 discusses the concept of adding an anodic metal to an $FeS_2$ cathode in a non-aqueous cell to reduce initial voltage spikes. However, this type of cell differs from the thermal cells to which the invention is applied and the results achieved in thermal cells with the materials suggested are worse than those achieved in conventional thermal cells. Thus they are not applicable for use in thermal type batteries.

SUMMARY OF THE INVENTION

Thus, it is an object of the invention to provide a method of substantially eliminating the initial voltage transients observed in thermal batteries using an $FeS_2$ depolarizer, during the initial activation period thereof, which is simple and functions more effectively than the prior art methods.

It is also an object to provide an $FeS_2$ depolarizer, or cathode material type thermal battery having a negligible voltage spike or transient during the initial activation thereof.

It is still another object of the invention to provide a $FeS_2$ cathode for use in a thermal battery which does not cause an initial voltage transient when the thermal battery is initially activated, and which does not substantially reduce the effective life of such a battery.

Upon further study of the specification and appended claims, further objects and advantages of this invention will become apparent to those skilled in the art.

In accordance with the invention an additive is used in iron disulfide ($FeS_2$) depolarized thermal battery cathodes. The additive substantially improves the voltage regulation of thermal batteries by substantially eliminating the initial voltage transient observed during the first few minutes of battery discharge, and comprises generally a calcium silicide ($CaSi_2$) additive.

The particle sizes of the $CaSi_2$ and the $FeS_2$, as well as the weight percentage of $CaSi_2$ in the cathode, affect the short circuiting of the cathode. As a result, the cathode can be tailored to have a composition to remove the normally occurring voltage spike.

The thermal battery, as well as the cathode for use in a thermal battery, comprises $FeS_2$ having a relatively small percentage of $CaSi_2$ dispersed therein. The remainder of the thermal battery is constructed in accordance with conventional thermal battery technology as discussed previously.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
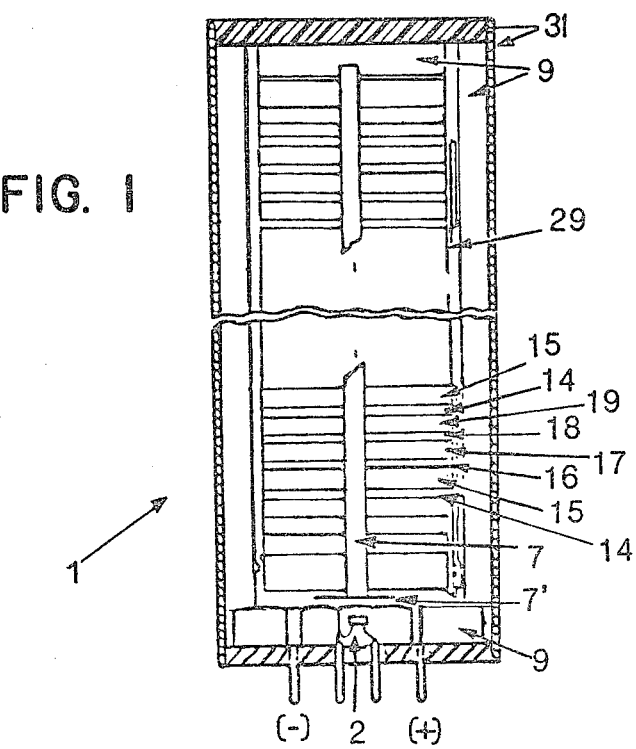
FIG. 1 illustrates a typical construction, in a cutaway view, of a thermal battery in which the invention is employed.

FIG. 1 illustrates, in a cutaway view, a typical thermal battery 1 construction employing pellet technology. The thermal battery 1 illustrated in FIG. 1 generally comprises a stack of single cells, each of which comprises a current collector 14, an anode pellet 15, a separator pellet 16, a cathode pellet 17, another current collector 18, and a heat pellet 19. In this battery $FeS_2$ is used as the depolarizer and the anode is typically a Lithium alloy such as Lithium Silicon or Lithium Aluminum.

In order to activate the battery, an electrical match 2 is provided connected to the outside by means of a pad 7', and to the heat paper fuse strip 7. When activated, insulation 9 surrounding the battery components inside the casing helps prevent heat losses to the exterior. Also interposed between the insulation 9 and the cells is a FIBERFRAX wrap 29 which is a ceramic fiber manufactured by the Corborundum Company, all the components are enclosed in a case 31. As illustrated by the broken line, the number of cells can be adjusted according to the required voltage.

In accordance with the invention, the iron disulfide ($FeS_2$) includes a calcium silicide ($CaSi_2$) additive which substantially improves the voltage regulation of the thermal batteries. More specifically, by manufacturing the thermal battery $FeS_2$ depolarized cathode with relatively small amounts of $CaSi_2$, the initial voltage transient observed during the first few minutes of battery discharge in $FeS_2$ cathode batteries is substantially eliminated.

The observed voltage spike in $FeS_2$ cathode batteries is now known to result from at least the five following mechanisms: (1) a thermodynamic increase in the potential caused by the initial temperature peak resulting when the heat pellets are ignited; (2) the electrochemical participation of surface contaminants on the $FeS_2$; (3) the electrochemical reduction of oxygen or reaction products of oxygen with $FeS_2$; (4) the electrochemical reduction of elemental sulfur produced by the thermal decomposition of $FeS_2$; and (5) the voltage decrease which accompanies the saturation of the electrolyte with the electrochemical reduction product or products. These mechanisms combine to cause a sharply peaked initial voltage that declines over several minutes. More specifically, the voltage peak may be up to 6 volts greater than the nominal operating voltage in a 28 volt battery.

For battery applications, calcium silicide ($CaSi_2$) is normally considered as an anodic material. More specifically, in fused salt systems $CaSi_2$ polarizes rapidly as the calcium becomes depleted. Thus, without intending to limit the scope of this invention in any way, it is believed that the $CaSi_2$ creates an internal short circuit when the $FeS_2$ cathode is initiated by the melting of the electrolyte. As the calcium in the $CaSi_2$ is depleted, polarization of each particle of $CaSi_2$ occurs causing a decreasing ability to short circuit the cathode. Moreover, since the voltage spike only occurs initially upon activation of the battery, the decreasing ability of the $CaSi_2$ to short circuit the cathode is desirable so as to maintain the voltage output stable at about a desired value, e.g., 28 volts. Furthermore, because of the mechanism involved, by controlling the particle size of both the $CaSi_2$ and the $FeS_2$, as well as the weight percentage of $CaSi_2$ in the cathode, the short circuiting effect on the cathode can be tailored to completely remove the observed voltage spike.

More specifically, it is preferred that the amount of $CaSi_2$ additive to the cathode be 1-3% by weight based on the total weight of cathode, preferably no more than 2.5%, and it is even more preferable that it be 2% by weight. The percent by weight of $FeS_2$ in the depolarizer is preferred to be at least 64% on the same basis, and more preferably 75%, and even more preferably 90%, with the remainder of the depolarizer being made up of the electrolyte and/or other conventional materials. In this regard, it is important to note that is is preferable to have as high a weight percent of $FeS_2$ as possible. More specifically, the more $FeS_2$ provided, the greater the current carrying capability of the depolarizer.

The particle size of both the $FeS_2$ and the $CaSi_2$ becomes important because the described activity is a function of the surface area by particle. If the $FeS_2$ employed is fine, then it is also desired that the $CaSi_2$ be fine. If the sizes of the particles of the two materials are too far apart, i.e., one very coarse and the other very fine, the effectiveness of the additive is diminished.

Typically, the mesh size for $FeS_2$ particles (U.S. standard sieve size designation, U.S. std.) can be $-40$ mesh to $-325$ mesh, the ($-$) minus sign indicating that the particles are of a size which will fall through this size mesh, i.e., are smaller than the mesh openings. If a ($+$) positive sign is used, this indicates that the particles will be supported by a mesh of the indicated size. The particle size for the $CaSi_2$ typically is of a size of $-60$ mesh, with a preferred size of $-60$ mesh/$+100$ mesh.

As will be appreciated from the above-discussion, the particle size can be tailored through routine parametric experimentation to achieve the desired effect.

When manufacturing the battery, the $CaSi_2$ additive is incorporated into the mix used to make up the depolarizer. Therefore, the resultant distribution of the $CaSi_2$ throughout the depolarizer should be as homogeneous as possible within the limitations of the conventional manufacturing techniques.

This invention is applicable to thermal batteries based on depolarizer materials other than $FeS_2$ such as $NiS_1$, $NiS_2$, $TiS_2$, etc. On the other hand, equivalents of $CaSi_2$ as used in this invention include aluminum powder and various calcium alloys such as those of calcium with lead.

Figure 2:
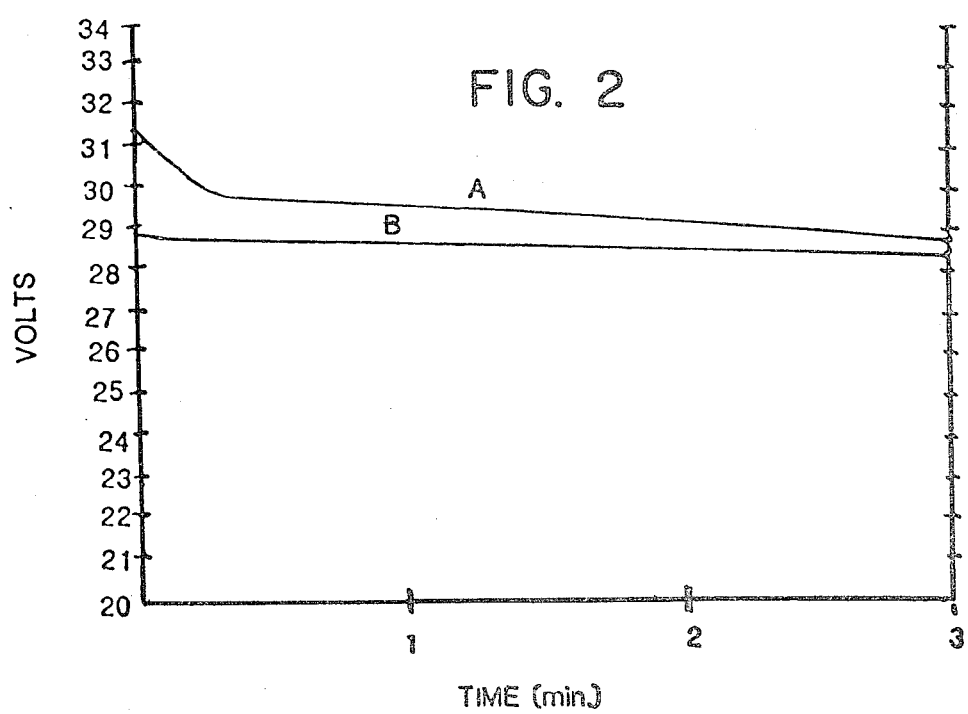
FIG. 2 is a graph illustrating the voltage output of a conventional $LiSi/FeS_2$ thermal battery over time as compared to the voltage output of an $LiSi/FeS_2$ thermal battery having small amounts of $CaSi_2$ added to the depolarizer or cathode material in accordance with the invention.

FIG. 2 is a graph plotting the voltage curve of a conventional $LiSi/FeS_2$ thermal battery versus time for the first three minutes at a current density of 50 $mA/cm^2$. Curve A illustrates the conventional prior art battery without the additive of the invention. In this graph, the initial voltage transient occurring in this type of battery can be clearly observed. In comparison, curve B shows the voltage curve for a battery having $CaSi_2$ added thereto. More specifically, the substantial elimination of the voltage transient is observed with the voltage output during the first three minutes, and is observed at between 28 V and 29 V. In comparison, the curve of A starts at above 31 V and decreases to under 29 V over the first three minutes. Since, battery life is measured in terms of time to 80% initial voltage output, it is clear that without the additive there is a substantially reduced battery life.

Although the voltage versus time test and resulting graph of FIG. 2 was conducted at a current density of 50 $mA/cm^2$, the results achieved are the same for virtually all current densities. More particularly, the voltage transient was found to be virtually eliminated in tests conducted with an open circuit up to current densities of 1 $amp/cm^2$. Having briefly described the curves of FIG. 2, the specific composition of the cathode employed to achieve line B will be discussed in more detail in the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In the cathode employed to achieve the graph of curve B in FIG. 2, 1.5% by weight $CaSi_2$ was added to the $FeS_2$ cathode. The mesh size for the particles of $CaSi_2$ employed was a $-60$ mesh. The $FeS_2$ content of the cathode was 64% by weight, and the $FeS_2$ particles were of $-230/+325$ mesh size. The remaining materials in the cathode, i.e, depolarizer, were conventional. As can be seen from FIG. 2, the voltage spike was almost completely eliminated with a resulting substantially flat response.

EXAMPLE 2

Since it was known that particle size as well as percentage amounts of the materials affect the tailoring of the voltage spike, the weight percent amounts of both $FeS_2$ and $CaSi_2$ were increased, and the particle size of the $FeS_2$ was reduced with the particle size of the $CaSi_2$ limited to a specific range.

More specifically, the cathode contained 75% by weight $FeS_2$ with $-325$ mesh size particles. The increased $FeS_2$ amount is important because the cathode was then able to carry current better than the cathode of Example 1. Likewise the amount of $CaSi_2$ was increased to 2% by weight with a particle size which was passed through a 60 mesh but supported on a 100 mesh, i.e., $-60/+100$.

The results achieved were optimum with respect to flat voltage response, i.e., the resulting curve was virtually flat, even more so than with the cathode of Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a depolarized thermal battery having a plurality of single cell pellets arranged in a stack, with each single cell comprising a heat pellet and, two current collectors having an anode pellet, a separator pellet, and a cathode pellet comprised of $FeS_2$ and a solid electrolyte, sandwiched therebetween, said thermal battery further including means for activating the battery by melting the electrolyte, the improvement wherein the depolarizer comprises an amount of particulate $CaSi_2$ effective to substantially eliminate the occurrence of a voltage spike during the initial period of activation of the depolarized thermal battery.

2. A thermal battery as in claim 1 wherein the amount of $CaSi_2$ in the depolarizer is 1–3% by weight.

3. A thermal battery as in claim 2 wherein the amount of $CaSi_2$ in the depolarizer is no more than 2.5% by weight.

4. A thermal battery as in claim 2 wherein the amount of $CaSi_2$ in the depolarizer is about 2% by weight.

5. A thermal battery as in claim 2 wherein the amount of $FeS_2$ in the depolarizer is 64–90% by weight.

6. A thermal battery as in claim 5 wherein the amount of $FeS_2$ in the depolarizer is about 75% by weight.

7. A thermal battery as in claim 5 wherein the particle size of the $CaSi_2$ in the depolarizer is $-60$ mesh (U.S. std.) and the particle size of the $FeS_2$ is $-40$ mesh (U.S. std.).

8. A thermal battery as in claim 7 wherein the particle size of the $CaSi_2$ is $-60/+100$ mesh (U.S. std.) and particle size of the $FeS_2$ is $-325$ mesh (U.S. std.).

9. A thermal battery as in claim 8 wherein the amount of $FeS_2$ in the depolarizer is at least 75% by weight, and the amount of $CaSi_2$ in the depolarizer is 2% by weight.

10. A thermal battery as in claim 9 wherein the amount of $FeS_2$ in the depolarizer is 90% by weight.

11. In an $FeS_2$ depolarizer useful in an $LiSi/FeS_2$ thermal battery of the type having a solid electrolyte and which is activated by heating and melting of the electrolyte, the improvement wherein the depolarizer contains an effective amount of $CaSi_2$ whereby when said improved $FeS_2$ depolarizer is used in said thermal battery the initial voltage transient occurring upon activation is substantially eliminated.

12. A depolarizer as in claim 11 wherein the amount of $FeS_2$ in the depolarizer comprises 64–90% by weight, and the amount of $CaSi_2$ additive comprises 1–3% by weight.

* * * * *